(12) United States Patent
Burgner et al.

(10) Patent No.: US 11,496,873 B2
(45) Date of Patent: Nov. 8, 2022

(54) SYSTEM FOR CONNECTING A MOBILE DEVICE TO A MOTOR VEHICLE

(71) Applicant: Bayerische Motoren Werke Aktiengesellschaft, Munich (DE)

(72) Inventors: Peter Burgner, Mountain View, CA (US); Alexandra Seifert, Munich (DE); Walter Bronzi, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/283,592

(22) PCT Filed: Sep. 27, 2019

(86) PCT No.: PCT/DE2019/100856
§ 371 (c)(1),
(2) Date: Apr. 8, 2021

(87) PCT Pub. No.: WO2020/074041
PCT Pub. Date: Apr. 16, 2020

(65) Prior Publication Data
US 2021/0392481 A1  Dec. 16, 2021

(30) Foreign Application Priority Data
Oct. 8, 2018 (DE) .......................... 102018124734.6

(51) Int. Cl.
*H04W 4/80* (2018.01)
*H04B 17/318* (2015.01)
(Continued)

(52) U.S. Cl.
CPC ............... *H04W 4/80* (2018.02); *G01S 13/46* (2013.01); *H01Q 1/3208* (2013.01);
(Continued)

(58) Field of Classification Search
CPC ......... H04W 4/80; H04W 4/40; H04W 4/025; H04W 76/10; H04W 52/0245;
(Continued)

(56) References Cited

U.S. PATENT DOCUMENTS 10,425,767 B1 *  9/2019  Molnar ................... H04W 4/23
2014/0073244 A1   3/2014  Ko et al.
(Continued)

FOREIGN PATENT DOCUMENTS

DE  102012214458 A1  2/2013
DE  102014107506 A1  12/2015
(Continued)

*Primary Examiner* — Tuan H Nguyen
(74) *Attorney, Agent, or Firm* — 2SPL Patent Attorneys PartG mbB; Kieran O'Leary

(57) ABSTRACT

A system for connecting a mobile device to a motor vehicle via a Bluetooth connection is proposed. The system comprises a processing unit for detecting a signal strength of a signal transmitted between the mobile device and the motor vehicle and for determining the position of the mobile device with respect to the motor vehicle based on the signal strength, and a connecting unit for coupling the mobile device and the motor vehicle via a Bluetooth Low Energy connection, for establishing a Bluetooth connection between the mobile device and the motor vehicle, and for coupling the mobile device to the motor vehicle via the Bluetooth connection based on the position of the mobile device and the Bluetooth Low Energy connection.

8 Claims, 2 Drawing Sheets

(51) Int. Cl.
*H04W 4/40* (2018.01)
*G01S 13/46* (2006.01)
*H01Q 1/32* (2006.01)

(52) U.S. Cl.
CPC ............ *H04B 17/318* (2015.01); *H04W 4/40* (2018.02); *G01S 2013/468* (2013.01)

(58) Field of Classification Search
CPC .. G01S 13/46; G01S 2013/468; G01S 5/0284; H04B 17/318; H04B 17/27; H01Q 1/3208; H01Q 1/32
See application file for complete search history.

(56) References Cited

U.S. PATENT DOCUMENTS

| | | |
|---|---|---|
| 2016/0071082 A1 | 3/2016 | Driscoll et al. |
| 2017/0105101 A1 | 4/2017 | Santavicca et al. |
| 2017/0149946 A1* | 5/2017 | Buttolo .................. H04W 4/48 |

FOREIGN PATENT DOCUMENTS

| | | |
|---|---|---|
| DE | 102016121894 A1 | 5/2017 |
| WO | 2018000134 A1 | 1/2018 |
| WO | 2018000156 A1 | 1/2018 |

* cited by examiner

SYSTEM FOR CONNECTING A MOBILE DEVICE TO A MOTOR VEHICLE

CROSS-REFERENCE TO RELATED APPLICATIONS

This application is a 35 U.S.C. § 371(c) national stage entry of PCT/DE2019/100856, filed on Sep. 27, 2019. That application claimed priority to German Application 10 2018 124 734.6, filed on Oct. 8, 2018. The contents of the earlier filed applications are incorporated by reference herein in their entirety.

FIELD

The proposed invention relates to a system for connecting a mobile device to a motor vehicle via a Bluetooth connection according to the preamble of claim 1, wherein the mobile device and the motor vehicle are coupled via a Bluetooth Low Energy connection, and to a method for connecting a mobile device to a motor vehicle via a Bluetooth connection according to the preamble of claim 10.

BACKGROUND

It is common to connect a mobile device, such as a mobile phone, smartphone or the like, to a motor vehicle. This enables the passengers of the motor vehicle, among other things, to play their own stored music via the motor vehicle or to make telephone calls in the motor vehicle via a hands-free device integrated in the motor vehicle. For this purpose, the mobile device, for example a mobile radio device, must be coupled to the motor vehicle in several steps, for which purpose, for example, a Bluetooth Classic connection (hereinafter referred to as Bluetooth connection for the sake of simplicity) may be used. However, it is necessary to manually couple the mobile device with the motor vehicle at least once, i.e., by entering manual commands. For example, the devices to be coupled must both be visible. For this purpose, the motor vehicle must be brought into a certain state, e.g., by selecting the appropriate function, and an action is also required on the side of the mobile device to make it visible. Only when both devices are set to this state may coupling via a Bluetooth connection take place. Further actions, such as selecting the respective device at the other communication partner and confirming a code, are also required.

If several mobile devices are to be used with the motor vehicle, it is also necessary to define in advance which mobile device is to have which Bluetooth settings and/or rights in the motor vehicle. This also requires a manual entry at least at the beginning of the coupling. However, such manual entries are difficult or impossible to make, especially when the motor vehicle is in operation, i.e., while driving.

It is therefore the object of the present invention to provide a system using which an easier coupling of a mobile device to a motor vehicle via a Bluetooth connection is possible.

SUMMARY

This object is solved by a system for connecting a mobile device to a motor vehicle via a Bluetooth connection according to patent claim 1 as well as a method for connecting a mobile device to a motor vehicle via a Bluetooth connection according to patent claim 10.

In the following, a Bluetooth connection is always understood to be a classic Bluetooth connection (also called Bluetooth Classic), as opposed to a Bluetooth Low Energy connection (also called BLE or BTLE connection).

According to the proposed system, the mobile device and the motor vehicle are first coupled via a Bluetooth Low Energy (BLE) connection and the same is used to establish the Bluetooth connection. Bluetooth Low Energy is a radio technology that allows devices to connect with lower power consumption, a longer range and a simpler coupling algorithm compared to traditional Bluetooth. In order to connect via the Bluetooth Low Energy connection, either the motor vehicle or the mobile device periodically sends packets on a so-called advertising channel. The other device listens periodically on this channel, wherein the contact is successful as soon as a packet is received. This Bluetooth Low Energy connection allows the mobile device and the motor vehicle to exchange various information, as explained in more detail below.

Now, to establish a Bluetooth connection, the system comprises a processing unit. The processing unit is used to first detect a signal strength of a signal transmitted between the mobile device and the motor vehicle (i.e., from the mobile device to the motor vehicle or vice versa). Based on the signal strength, the processing unit may subsequently determine a position of the mobile device with respect to the motor vehicle.

Here it may be determined whether the mobile device is inside or outside the motor vehicle. Depending on the information used (e.g., the number of antennas), the position of the mobile device within the vehicle may also be determined, i.e., whether it is a device belonging to a driver or another passenger of the motor vehicle.

Based on the determined position, a connecting unit of the system may now first couple the mobile device and the motor vehicle via a Bluetooth Low Energy connection. This is only performed when the specific position of the mobile device is located within the motor vehicle. Subsequently a Bluetooth connection may be setup between the mobile device and the motor vehicle. For this purpose, on the one hand, the already existing Bluetooth Low Energy connection is used, via which the mobile device and the motor vehicle are already connected, and from which the mutual identity is already known. On the other hand, the position of the mobile device is used.

According to a further embodiment, the processing unit is configured to associate the determined position with a stored profile for a Bluetooth connection. Once the processing unit has determined in which position the mobile device is located in the motor vehicle, the processing unit may determine whether the mobile device is the mobile device of a driver or another passenger. For example, the driver may be assigned a different profile than another passenger. The profiles may be distinguished by different rights. For example, a profile may specify that the driver's mobile device is coupled to the motor vehicle for a telephone connection, whereas another passenger's mobile device is provided only for transferring music data.

In this way, targeted Bluetooth connections may be established, which already define which profiles are to be used for the Bluetooth connection without additional manual input. Compared to a conventional coupling between two devices via a Bluetooth connection, the proposed system is therefore able to provide a simpler connection setup, where it is not necessary to define via a manual input which rights are to be made available to the mobile device in the motor vehicle when coupling via Bluetooth. This is done solely based on the determined position of the mobile device.

According to another embodiment, the processing unit is configured to detect a transmission energy and/or a signal-to-noise ratio (SNR ratio) of the signal transmitted between the mobile device and the motor vehicle. By using both signal strength (RSSI) and a transmission energy and/or SNR ratio, the position of the mobile device may be determined in an improved manner. Since not only the signal strength is used, but also other information of the signal, the position may be determined more precisely and not only based on the signal strength. For example, machine learning (e.g., based on neural networks) may be used to interpret the various values of signal strength, transmission energy, and/or SNR ratio.

According to another embodiment, the system comprises one or more antennas arranged in the motor vehicle. These antennas may be used to receive the signal transmitted between the mobile device and the motor vehicle. Due to the positions of the various antennas in the motor vehicle, it is possible to determine the signal strength at various positions in the motor vehicle and, based on this, to determine the position of the mobile device. For example, based on the signal received from the antennas, the processing unit may perform triangulation to determine an accurate position of the mobile device in the motor vehicle.

According to another embodiment, the connecting unit is configured to determine information about the mobile device and the motor vehicle using the Bluetooth Low Energy connection. This information may include, for example, information that displays an image of the device, or information about preferences of the device, such as which Bluetooth profile this mobile device usually connects to, in order to make those exact connections based on that information. The information may therefore include, for example, stored profiles, associated individuals, further information, the device and/or historical data indicating how the mobile device has been connected to date.

For example, the historical data may indicate that the mobile device was previously identified as the driver's device and connected to the motor vehicle using that profile. Based on this historical data, the mobile device may, for example, be connected as the driver's device even if it is located on the passenger seat.

According to another embodiment, the connecting unit is configured to automatically couple the mobile device and the motor vehicle via the Bluetooth connection. The Bluetooth Low Energy connection may be established as described above. Once contact has been established, either the mobile device or the motor vehicle may initiate coupling via Bluetooth Low Energy. For this purpose, only a message about the pending coupling is displayed on the two devices, i.e., a display unit of the motor vehicle and a display unit of the mobile device. This message and/or the coupling must now be confirmed by a user, such as the driver or other passenger.

Unlike Bluetooth connections, which usually require a code to be entered, this case only requires confirmation of the coupling. Since the devices are already known to each other via the Bluetooth Low Energy connection, it is not necessary to enter additional codes, e.g., to perform identification. Therefore, if such a Bluetooth Low Energy connection exists, it is not necessary either to enter a code for a Bluetooth connection to be established. Rather, this may be automated by the motor vehicle or mobile device without requiring manual input from a user.

According to a further aspect, a method for connecting a mobile device to a motor vehicle via a Bluetooth connection is proposed. The method comprises the following steps: Detecting a signal strength of a signal transmitted between the mobile device and the motor vehicle, determining the position of the mobile device with respect to the motor vehicle based on the signal strength, coupling the mobile device and the motor vehicle via a Bluetooth Low Energy connection, establishing a Bluetooth connection between the mobile device and the motor vehicle, and coupling the mobile device to the motor vehicle via the Bluetooth connection based on the position of the mobile device and the Bluetooth Low Energy connection.

The embodiments and features described for the proposed device apply accordingly to the proposed method.

Furthermore, a computer program product is proposed which comprises a program code which is configured to cause a computer to execute the method as described above.

A computer program product, such as a computer program means, may be provided or delivered, for example, as a storage medium, such as a memory card, USB stick, CD-ROM, DVD, or in the form of a downloadable file from a server in a network. For example, in a wireless communication network, this may be done by transmitting a corresponding file with the computer program product or computer program means.

Further possible implementations of the invention also include combinations of features or embodiments not explicitly mentioned before or in the following regarding the embodiments. The person skilled in the art will also add individual aspects as improvements or additions to the respective basic form of the invention.

Further advantages and advantageous embodiments are indicated in the description, drawings and claims. In particular, the combinations of the features indicated in the description and the drawings are purely exemplary, so that the features may also be present individually or in other combinations.

In the following, the invention shall be described in more detail by means of embodiments shown in the drawings. Here, the embodiments and the combinations shown in the embodiments are purely exemplary and are not intended to define the scope of the invention. This is defined solely by the pending claims, in which:

DETAILED DESCRIPTION

Figure 1:
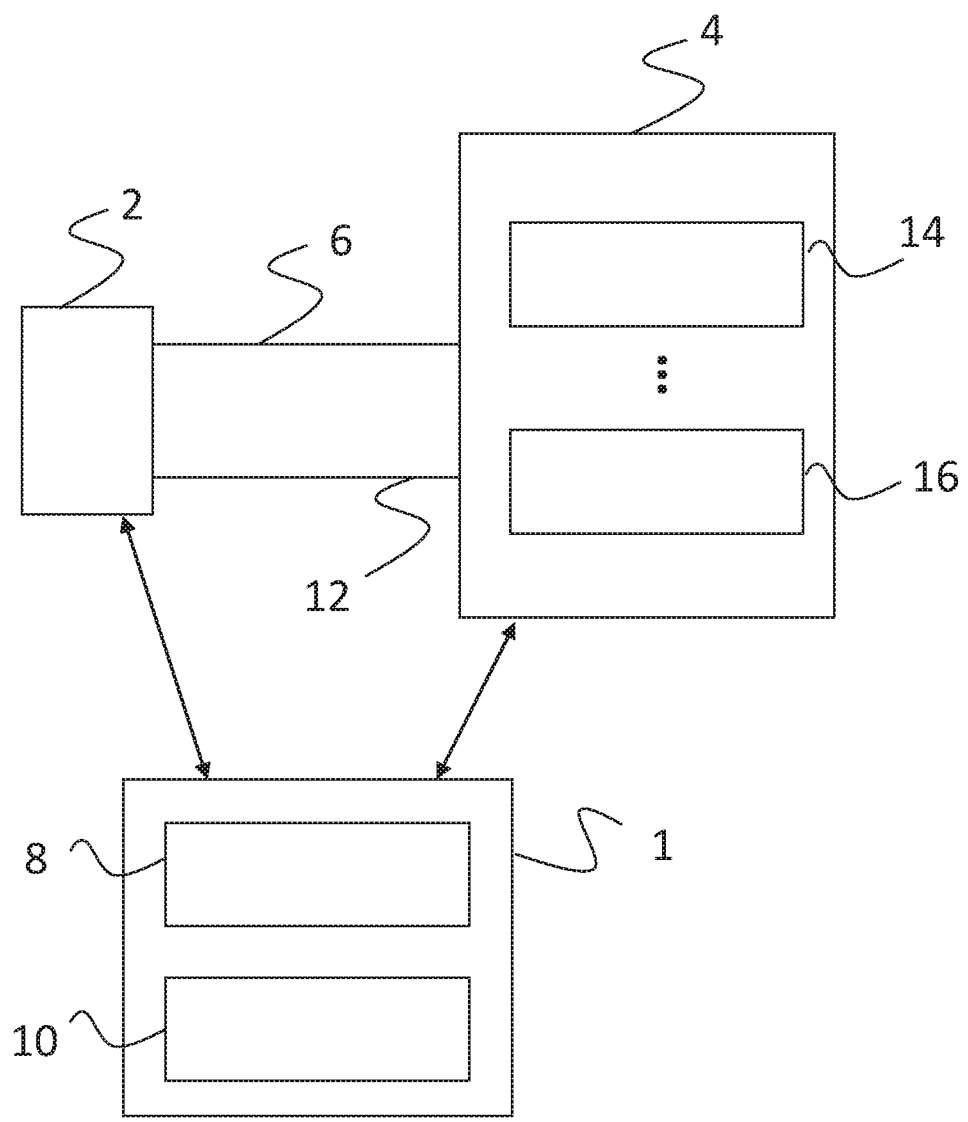
FIG. 1: shows a schematic block diagram of a system for connecting a mobile device to a motor vehicle.

In the following, identical or functionally equivalent elements are designated by the same reference numerals.

FIG. 1 shows a system 1 for connecting a mobile device 2 to a motor vehicle 4. The system 1 may be part of the motor vehicle 4 or may be arranged separately therefrom. Further, the system 1 may also comprise one or more parts that may be arranged in different or the same positions (i.e., in the motor vehicle 4 or outside thereof).

The mobile device 2 and the motor vehicle 4 are first coupled via a Bluetooth Low Energy connection 6. The same is established between the mobile device 2 and the motor vehicle 4 by the motor vehicle 4 detecting that a mobile device 2 is within range. This is done, for example, via a signal strength of a signal transmitted by the mobile device 2 or the motor vehicle 4.

The signal strength of the signal sent between the device 2 and the motor vehicle 4 may be determined by a processing unit 8 of the system 1. Based on the signal strength, the processing unit 8 may determine a position of the mobile device 2, in particular whether the mobile device 2 is inside or outside the motor vehicle 4. In addition to the signal strength (RSSI), the processing unit 8 may further use a signal-to-noise ratio or a transmission energy to determine the exact position of the mobile device 2.

One or more antennas 14, 16 may be provided in the motor vehicle 4 for determining the signal strength of a signal of the mobile device 2. The processing unit 8 may use signals received from the antennas 14, 16 to perform, for example, triangulation of the signals to determine the exact position of the device 2 with respect to the motor vehicle 4 or even within the motor vehicle 4.

The position of the mobile device 2 may also define whether the mobile device 2 is a device of a driver or another passenger of the motor vehicle 4. Based on the position, a connecting unit 10 of the system 1 may now first couple the mobile device 2 and the motor vehicle 4 via a Bluetooth Low Energy connection 6. Subsequently, the connecting unit 10 may setup a Bluetooth connection 12 between the mobile device 2 and the motor vehicle 4. In establishing the Bluetooth connection 12, both the position of the mobile device 2 and the Bluetooth Low Energy connection 6 are used. The position of the mobile device 2 on the one hand determines whether a connection is to be established at all. When the mobile device 2 is outside the motor vehicle 4, neither a Bluetooth Low Energy connection 6 nor a Bluetooth connection 12 is established. If a more precise position of the mobile device 2 in the motor vehicle 4 is known, the same may be used to determine which profile is used to connect the mobile device 2 to the motor vehicle 4. The profile may define which rights are assigned to the mobile device 2 in the motor vehicle 4.

Additionally, it is possible for the Bluetooth connection 12 to be established without further manual input by a user, as the mobile device 2 and the motor vehicle 4 are already communicating and are known to each other via the Bluetooth Low Energy connection 6. A further confirmation of the devices to one another by entering a code may therefore be omitted.

Figure 2:
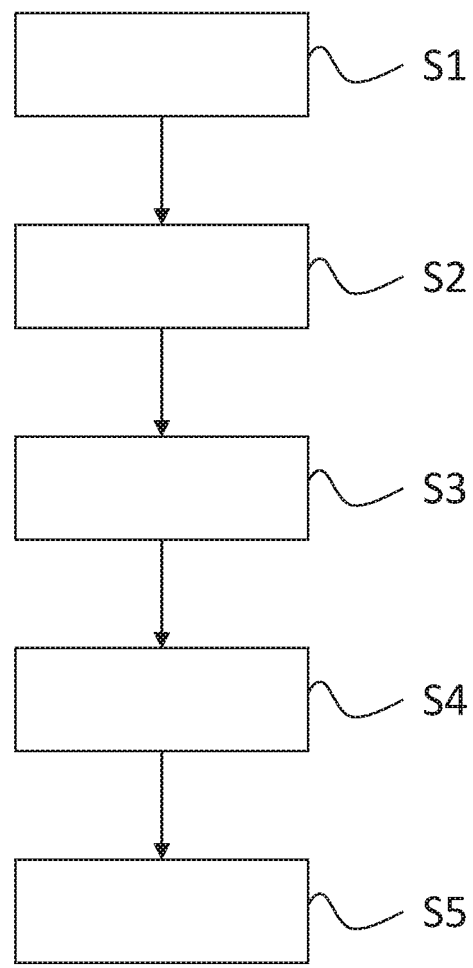
FIG. 2: shows a schematic flowchart of a method for connecting a mobile device to a motor vehicle.

FIG. 2 shows a schematic flow chart of a method for connecting a mobile device 2 to a motor vehicle 4 via a Bluetooth connection 12. As described in connection with FIG. 1, the mobile device 2 and the motor vehicle 4 are initially coupled via a Bluetooth Low Energy connection 6. In order to couple the mobile device 2 and the motor vehicle 4 via a Bluetooth connection 12, in a first step S1, the signal strength of a signal transmitted between the mobile device 2 and the motor vehicle 4 is detected. This may be done as described in connection with FIG. 1.

Based on the signal strength, in a second step S2 the position of the mobile device 2 with respect to the motor vehicle 4 is determined. To this end, the signal may be received by a plurality of antennas 14, 16 in the motor vehicle 4 and the position of the mobile device 2 may be determined by different signal strengths at each of the antennas 14, 16.

Once the position of the mobile device 2 has been determined, in a third step S3, the mobile device 2 may first be coupled to the motor vehicle 4 via a Bluetooth Low Energy connection 6.

Subsequently, in a fourth step S4, the Bluetooth connection 12 between the mobile device 2 and the motor vehicle 4 may be established and the mobile device 2 and the motor vehicle 4 may be coupled using the Bluetooth Low Energy connection 6. In step S5, the mobile device 2 may then be connected to the motor vehicle 4 via the Bluetooth connection 12 using an associated profile. Where possible, the profile takes into account the position of the mobile device 2 within the motor vehicle 4.

The system and/or method described thus makes it possible to connect a mobile device to a motor vehicle in a simple manner, whereby in particular different profiles may be assigned to a device in an automated manner based on an already existing Bluetooth Low Energy connection for a Bluetooth connection to be established.

REFERENCE NUMERALS

1 System
2 Mobile device
4 Motor vehicle
6 Bluetooth Low Energy connection
8 Processing unit
10 Connecting unit
12 Bluetooth connection
16 Antennas
S1-S5 Method steps

The invention claimed is:

1. A system for connecting a mobile device to a motor vehicle via a Bluetooth connection, the system characterized by:
    a processing unit for:
        detecting a signal strength and a transmission energy or a signal-to-noise ratio of a signal transmitted between the mobile device and the motor vehicle and for determining a position of the mobile device with respect to the motor vehicle based on a combination of the signal strength and the transmission energy or the signal-to-noise ratio, and
        associating the determined position with a stored profile for a Bluetooth connection, and
    a connecting unit for:
        coupling the mobile device and the motor vehicle via a Bluetooth Low Energy connection,
        determining information about the mobile device and the motor vehicle using the Bluetooth Low Energy connection,
        establishing a Bluetooth connection between the mobile device and the motor vehicle based on the determined information, and
        coupling the mobile device to the motor vehicle via the Bluetooth connection based on the position of the mobile device and the Bluetooth Low Energy connection.

2. The system according to claim 1, characterized in that the processing unit is configured to detect the transmission energy and the signal-to-noise ratio of the signal transmitted between the mobile device and the motor vehicle and to determine the position of the mobile device based on a combination of the signal strength, the transmission energy, and the signal-to-noise ratio.

3. The system according to claim 1, characterized by one or more antennas arranged in the motor vehicle, wherein the antennas are adapted to receive the signal transmitted between the mobile device and the motor vehicle.

4. The system according to claim 3, characterized in that the processing unit is configured to perform triangulation based on the signal received from the antennas.

5. The system according to claim 1, characterized in that the determined information includes stored profiles and/or historical data.

6. The system according to claim 1, characterized in that the connecting unit is configured to automatically couple the mobile device and the motor vehicle via the Bluetooth connection.

7. A method for connecting a mobile device to a motor vehicle via a Bluetooth connection, the method characterized by:
   detecting a signal strength and a transmission energy or a signal-to noise ratio of a signal transmitted between the mobile device and the motor vehicle,
   determining a position of the mobile device with respect to the motor vehicle based on a combination of the signal strength and the transmission energy or the signal-to-noise ratio,
   associating the determined position with a stored profile for a Bluetooth connection,
   coupling the mobile device and the motor vehicle via a Bluetooth Low Energy connection,
   determining information about the mobile device and the motor vehicle using the Bluetooth Low Energy connection,
   establish a Bluetooth connection between the mobile device and the motor vehicle based on the determined information, and
   coupling the mobile device to the motor vehicle via the Bluetooth connection based on the position of the mobile device and the Bluetooth Low Energy connection.

8. The method of claim 7, comprising:
   detecting the transmission energy and the signal-to-noise ratio of the signal transmitted between the mobile device and the motor vehicle, and
   determining the position of the mobile device based on a combination of the signal strength, the transmission energy, and the signal-to-noise ratio.

* * * * *